US007194686B1

(12) United States Patent
Suzuki et al.

(10) Patent No.: US 7,194,686 B1
(45) Date of Patent: Mar. 20, 2007

(54) METHOD AND APPARATUS FOR EDITING PERFORMANCE DATA WITH MODIFICATIONS OF ICONS OF MUSICAL SYMBOLS

(75) Inventors: Hideo Suzuki, Hamamatsu (JP); Masao Sakama, Hamamatsu (JP); Eiji Akazawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 331 days.

(21) Appl. No.: 09/666,364

(22) Filed: Sep. 20, 2000

(30) Foreign Application Priority Data

Sep. 24, 1999 (JP) ................................ 11-269582

(51) Int. Cl.
*G11B 27/00* (2006.01)
*G10H 1/06* (2006.01)
*G09B 15/00* (2006.01)

(52) U.S. Cl. ........................................ 715/716; 84/622

(58) Field of Classification Search ................ 345/767, 345/788, 802; 84/477 R, 615, 622; 715/716
See application file for complete search history.

(56) References Cited

U.S. PATENT DOCUMENTS 5,646,362 A 7/1997 Koyama et al.
5,889,519 A * 3/1999 Boezeman et al. ......... 345/723
5,969,716 A * 10/1999 Davis et al. ................ 345/726
6,031,529 A * 2/2000 Migos et al. ............... 345/783
6,160,213 A * 12/2000 Arnold et al. ................ 84/615
6,166,314 A * 12/2000 Weinstock et al. ......... 84/483.1
6,477,315 B1 * 11/2002 Ohomori ...................... 386/55

FOREIGN PATENT DOCUMENTS

JP 04-371989 12/1992
JP 05-127673 5/1993
JP 07-302080 11/1995

(Continued)

OTHER PUBLICATIONS

Aikin, J. (1993), "Emagic Notator Logic Sequencing Software (Macintosh)" *Keyboard* 19(10):120-121, and 123-128.

(Continued)

*Primary Examiner*—Kieu D. Vu
*Assistant Examiner*—Ting Zhou
(74) *Attorney, Agent, or Firm*—Morrison & Foerster LLP

(57) ABSTRACT

The present invention is directed to a system and method for providing a score window containing various types of execution icon layers onto which execution icons are attached and arranged in conformity with a progression of a musical tune on a screen of the display. In accordance with the preferred embodiment, each layer is controlled in response to various display commands. The system allows a user to select desired execution icons from an icon select palette that provides lists of execution icons which are registered in advance. Specifically, the user may select and "drag" an execution icon from the palette and place it at a position in correspondence with a particular point of progression of the music to be edited, causing the editing function corresponding to the execution icon to be effected at the point of progression of the musical piece. In accordance with the preferred embodiment, the execution icons are displayed by categories in accordance with a category display layer, which may be controlled to be displayed or not displayed in the editing screen.

11 Claims, 8 Drawing Sheets

FOREIGN PATENT DOCUMENTS

| | | |
|---|---|---|
| JP | 09-006346 | 1/1997 |
| JP | 10-187849 | 7/1998 |
| JP | 10-214083 | 8/1998 |
| WO | EP 00 12 0596 | 2/2001 |

OTHER PUBLICATIONS

Rideout, E. (1999), "Cakewalk Metro 4.5" *Keyboard* 25(1):84, 86, and 88-90.

CAKEWALK Pro Audio & Professional Version 6.0, reference manual, Japan, Roland Corporation, pp. 34-35, Nov. 14, 1997.

Rideout, E., "Cakewalk Metro 4.5", Keyboard, US Miller Freeman Publications, San Francisco, vol. 25, No. 1, Jan. 1999, pp. 84, 86, and 88-90.

Aikin J., "Emagic Notator Logic Sequencing Software (MacIntosh)", Keyboard, US Miller Freeman Publications, San Francisco, vol. 19, No. 10, Oct. 1, 1993, pp. 120-121 and 123-128.

* cited by examiner

METHOD AND APPARATUS FOR EDITING PERFORMANCE DATA WITH MODIFICATIONS OF ICONS OF MUSICAL SYMBOLS

BACKGROUND OF THE INVENTION

1. Field of the Invention

This invention relates to methods and apparatuses for editing performance data, and particularly to methods and apparatuses that convert original performance data to execution-related performance data using execution icons (or articulation icons). In addition, this invention also relates to recording media storing performance data editing programs and data.

This application is based on Patent Application No. Hei 11-269582 filed in Japan, the content of which is incorporated herein by reference.

2. Description of the Related Art

Conventionally, there are provided sound source devices named "execution-related sound sources" in connection with a variety of executions (or articulations, i.e., symbols, techniques or styles of music performance) such as glissando and tremolo. For example, Japanese Unexamined Patent Publication No. Hei 10-214083 discloses a musical tone generation technique in which execution codes are imparted to tune data such as standard MIDI files (SMF, where "MIDI" designates the known standard for "Musical Instrument Digital Interface") in response to manual operations. Concretely speaking, SMF data are displayed in musical notation as a musical score which a user watches to designate a part being related to an execution code. Hence, the user operates an execution designating operator (e.g., switch or button) to impart the execution code to the designated part of music.

Until now, however, no proposal nor development is made for improvement in performability for imparting execution codes to designated parts in SMF data in the conventional arts.

SUMMARY OF THE INVENTION

It is an object of the invention to provide a performance data editing system that is improved in efficiency and performability for converting normal performance data to execution-related performance data on a screen of a display with simple operations and without errors.

A performance data editing system of this invention is actualized by a computer system (or electronic musical instrument) which is equipped with a display and a mouse. The system initially provides a score window containing various types of execution icon layers onto which execution icons (representing musical symbols such as bend-up/down, grace-up/down, dynamics, glissando, tremolo) are attached and arranged in conformity with a progression of a musical tune on a screen of the display. For example, the layers are provided for a tempo, dynamics, joint, modulation, accent & duration, staff notation, attack, release, etc.

Each of the layers is independently controlled in response to various commands such as display-on, small-scale display, display-off and vertical rearrangement. In the small-scale display, the layer is reduced in vertical dimension to an extent that only visual recognition of existence of the layer (and its icon) is allowed. In the vertical rearrangement, it is possible to change a place of a desired layer in a display order on the score window.

Specifically, the system is designed to provide various properties in screen operations using various types of windows. That is, the system allows a user (or music editor) to select desired execution icons from an icon select palette that provides lists of execution icons which are registered in advance. On the icon select palette, an icon that is selected by the user is automatically moved to a highest place in display order and is highlighted in gray.

In addition, the system also allows the user to modify parameters of a specific icon which is selected from among the execution icons on the score window. That is, the user opens an icon modify window to change parameters of the specific icon with the mouse in a visual manner. On the icon modify window, the icon is magnified and installs handlers that are operated by the user with the mouse to change the parameters respectively.

Further, the system provides the user with a simple operation for deletion of execution-related data from performance data. That is, when the user performs drag-and-drop operations on a certain execution icon to move it to outside of a prescribed display area (e.g., layer window) of the score window, the system automatically deletes the corresponding execution-related data from the performance data.

Thus, it is possible to improve performability and efficiency in editing performance data by using icons with simple operations and without errors.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

[A] Hardware Configuration

Figure 1:
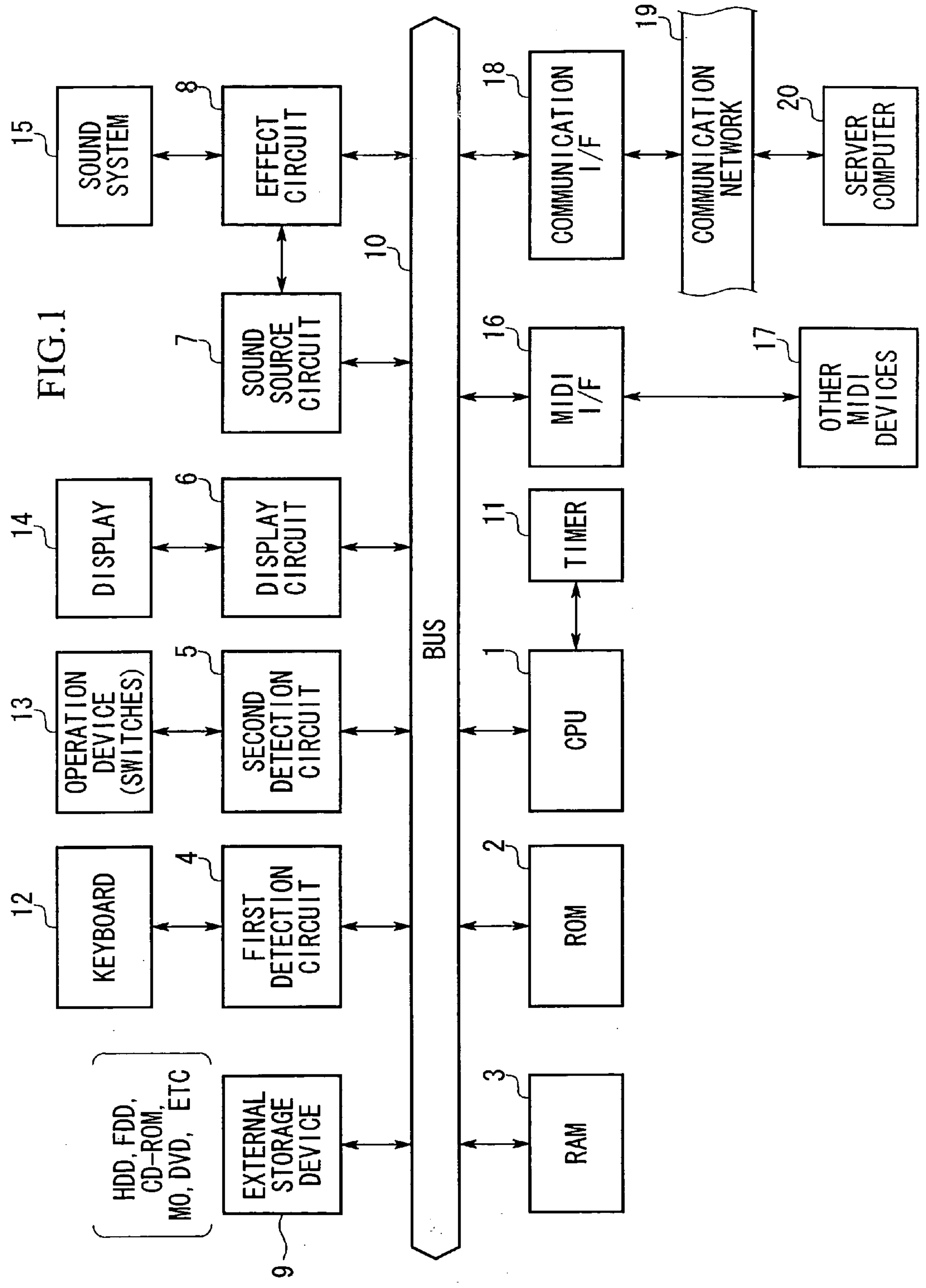
FIG. 1 is a block diagram showing a hardware configuration of a performance data editing system in accordance with preferred embodiment of the invention.

FIG. 1 is a block diagram showing a hardware configuration of a performance data editing system in accordance with the preferred embodiment of the invention. The performance data editing system is configured by a central processing unit (CPU) 1, a read-only memory (ROM) 2, a random-access memory (RAM) 3, first and second detection circuits 4, 5, a display circuit 6, a sound source circuit 7, an effect circuit 8 and an external storage device 9. All of the aforementioned devices and circuits are mutually interconnected with each other by way of a bus 10.

The CPU 1 performs overall controls on the system and is connected with a timer 11 that is used to generate tempo clock pulses and interrupt clock pulses. That is, the CPU 1 performs a variety of controls in accordance with prescribed programs and pivotally carries out performance data editing processes of this invention. The ROM 2 stores prescribed control programs for controlling the performance data editing system. The control programs are directed to basic performance data editing operations. In addition, the control programs may include a variety of processing programs, data and tables with respect to the performance data editing operations. The RAM 3 stores data and parameters which are needed for execution of the aforementioned processes. In addition, the RAM 3 is also used as a work area for temporarily storing a variety of data under processing.

The first detection circuit 4 is connected with a keyboard (device) 12, while the second detection circuit 5 is connected with an operation device 13 that corresponds to panel switches, a mouse, etc. The display circuit 6 is connected with a display 14. So, a human operator (i.e., user) is capable of operating the devices 12, 13 while watching various types of screens of the display 14. A sound system 15 is connected to the effect circuit 8 which is configured by a digital signal processor (DSP) or else. Herein, the sound system 15 cooperates with the sound source circuit 7 and effect circuit 8 to configure a musical tone output section, which contributes to generation of musical tones based on various kinds of performance information including performance data before and after processing of the performance data editing system.

The external storage device 9 is configured by a desired storage which is selected from among a hard-disk drive (HDD), a compact-disk drive, a CD-ROM drive, a floppy-disk drive (FDD), a magneto-optic (MO) disk drive and a digital-versatile-disk (DVD) drive, for example. Namely, the external storage device 9 is capable of storing a variety of control programs and data. Therefore, the performance data editing system of FIG. 1 is not necessarily limited in specification that the ROM 2 is solely used for storage of processing programs and data which are needed for execution of the performance data editing operations. In addition, it is possible to operate the system such that the RAM 3 loads the programs and data from the external storage device 9. Further, processing results can be stored in the external storage device 9 according to needs.

The performance data editing system of the present embodiment has a capability of communicating with other MIDI devices 17 by way of a MIDI interface 16 which is connected with the bus 10. The system is not necessarily limited in use of the MIDI interface 16 specially designed therefor. So, it is possible to use other general-use interfaces such as interfaces for RC-232C, universal serial bus (USB) and IEEE 1394 serial bus (where "IEEE" is an abbreviation for "Institute of Electrical and Electronics Engineers"). In this case, the system can be modified to simultaneously transmit or receive data other than MIDI messages. The bus 10 is also connected with a communication interface 18, which is being connected with a server computer 20 via a communication network 19. Hence, a variety of processing programs and data from the server computer 20 can be downloaded to the system, in which they are stored in the external storage device 9.

A typical example of the performance data editing system of this invention can be actualized by an electronic musical instrument which installs the keyboard 12 and operation device 13 as shown in FIG. 1. However, the system can be also actualized by a personal computer that installs software such as application programs for editing performance data, for example. In addition, the system is applicable to equipment or machine that creates tune data regarding musical tunes such as popular songs being played with orchestra sounds for karaoke apparatuses. Further, the system is applicable to player pianos that play automatic performance of piano sounds. Incidentally, electronic musical instruments used for actualization of the system are not necessarily limited to keyboard instruments, hence, they can be designed in other forms such as stringed instruments, wind instruments and percussion instruments. The sound source circuit 7 is not necessarily configured as a hardware sound source, hence, it can be configured as a software sound source. In addition, functions of the aforementioned musical tone output section (i.e., 7, 8, 15) including sound source functions are not necessarily placed under controls of the present system, hence, they can be placed under controls of the other MIDI devices 17 by using MIDI tools or communication tools of networks, for example.

[B] Score Window

Figure 2:
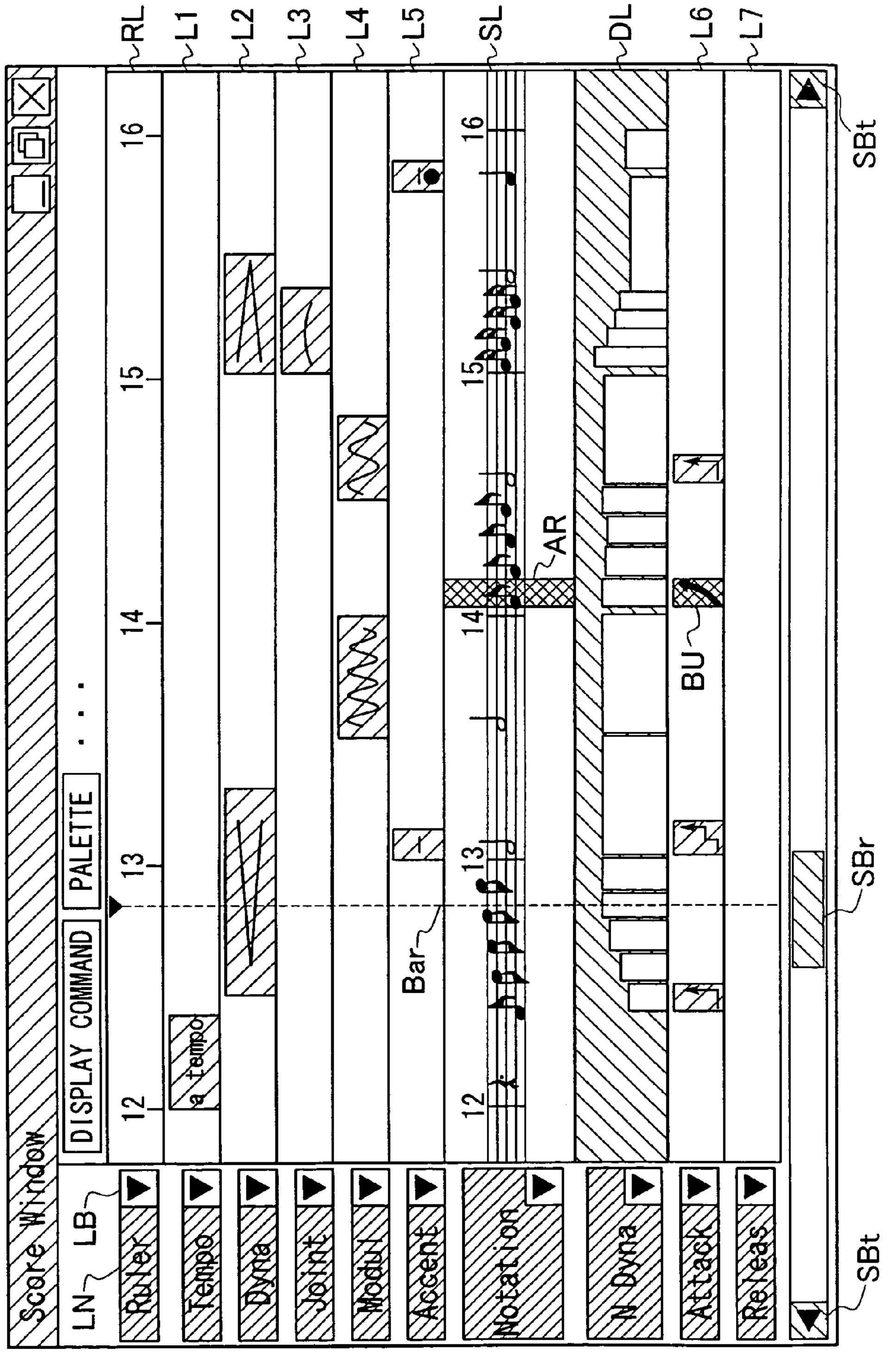
FIG. 2 shows an example of a score window containing layers being displayed on a screen of a display.

FIG. 2 shows an example of a score window being displayed on a screen of the display 14 of the performance data editing system of the present embodiment. The score window displays various kinds of data regarding the performance data in prescribed layer forms in accordance with prescribed procedures. That is, the score window of FIG. 2 contains ten types of layers which are arranged vertically from a top place to a bottom place on the screen of the display 14. Namely, the score window shows a bar (or measure) ruler layer RL, a tempo icon layer L1, a dynamics icon layer L2, a joint icon layer L3, a modulation icon layer L4, an accent icon layer L5, a staff (notation) icon layer SL, a dynamics graph layer DL, an attack icon layer L6 and a release icon layer L7.

Each of the layers (RL, L1, L2, . . . , L7) shows its prescribed data, which are arranged from the left to the right on the screen in connection with progression of performance data. The score window also includes a scroll area at a bottom of the screen to show left/right scroll buttons SBt and a left/right scroll bar (or box) SBr. Herein, the user operates the operation device 13 such as the mouse to turn on the scroll button SBt or move the scroll bar SBr in a right or left direction, so that it is possible to scroll all layers in a progression direction or a reverse progression direction of the performance data.

A pair of a layer name display portion LN and a layer operation button LB are shown on a left end of each of the layers (RL, L1, L2, . . . , L7). By pointing to the layer name display portion LN with a mouse cursor (or mouse pointer), it is possible to designate a corresponding layer as a subject being moved in display location. For example, it is possible to move a certain layer vertically to a different display location by dragging and dropping its layer name display portion LN onto another layer or between other layers. That is, it is possible to change an order of vertical arrangement of the layers. When the user clicks a certain layer operation button LB with the mouse, its corresponding layer is placed in a small-scale display mode in which it is contracted in display width and its content is simplified on the screen.

The bar ruler layer indicates time progression points entirely over the performance data by bar numbers. The staff (notation) icon layer SL shows a staff or score (i.e., white data) representing note information of the performance data. In addition, execution icon layers representing execution-related data are realized by the tempo icon layer L1, dynamics icon layer L2, joint icon layer L3, modulation icon layer L4, accent icon layer L5, attack icon layer L6 and release icon layer L7 respectively. That is, the execution icon layers L1 to L7 show execution icons, which correspond to articulation data (1) to (7) as follows:

(1) Tempo icon layer L1: retardando, a tempo.

(2) Dynamics icon layer L2: crescendo, diminuendo, loud/soft symbols (e.g., fortissimo, pianissimo) such as ff, . . . , ppp.

(3) Joint icon layer L3: normal slur (legato), bend slur.

(4) Modulation icon layer L4: vibrato, tremolo.

(5) Accent (& Duration) icon layer L5: accent, tenuto, staccato.

(6) Attack icon layer L6: bend-up/down, grace-up/down, glissando-up/down.

(7) Release icon layer L7: bend-up/down, grace-up/down, glissand-up/down.

The dynamics graph layer DL shows dynamics data of notes corresponding to the aforementioned icons (2) in a graphical manner. A tune progression bar Bar is displayed to vertically traverse the aforementioned layers RL, L1–L5, SL, DL, L6 and L7. The tune progression bar Bar moves in conformity with a horizontal dimension pointed by the mouse cursor. In a reproduction mode of the performance data, the tune progression bar Bar automatically moves in accordance with progression of reproduction of the performance data.

With respect to each of the plural execution icon layers L1 to L7, the present embodiment attaches an execution icon (or execution icons) representing execution-related data. Each of the execution icon layers has a layer window (or score area) for representation of the execution icon(s). For example, in the layer window of the attack icon layer L6, four execution icons including an bend-up icon BU are respectively attached at appropriate positions. Each of the execution icon layers L1 to L7 respond to various commands (or instructions) corresponding to "display on", "small-scale display", "display off" and "vertical rearrangement", for example. That is, each layer is placed in a full-scale display state in response to the display-on command, it is placed in a small-scale display state using a simplified image in response to the small-scale display command, or it is placed in a non-display state in response to the display-off command. In response to the vertical rearrangement command, it is changed in an order of vertical display locations. Incidentally, the user is capable of moving a desired execution icon being displayed on one of the execution icon layers L1–L7 outside of a prescribed display area of the score window by drag-and-drop operations using the mouse. When the system detects that the user moves the desired execution icon outside of the prescribed display area of the score window, the system automatically deletes corresponding execution-related data from the performance data.

Figure 3A:
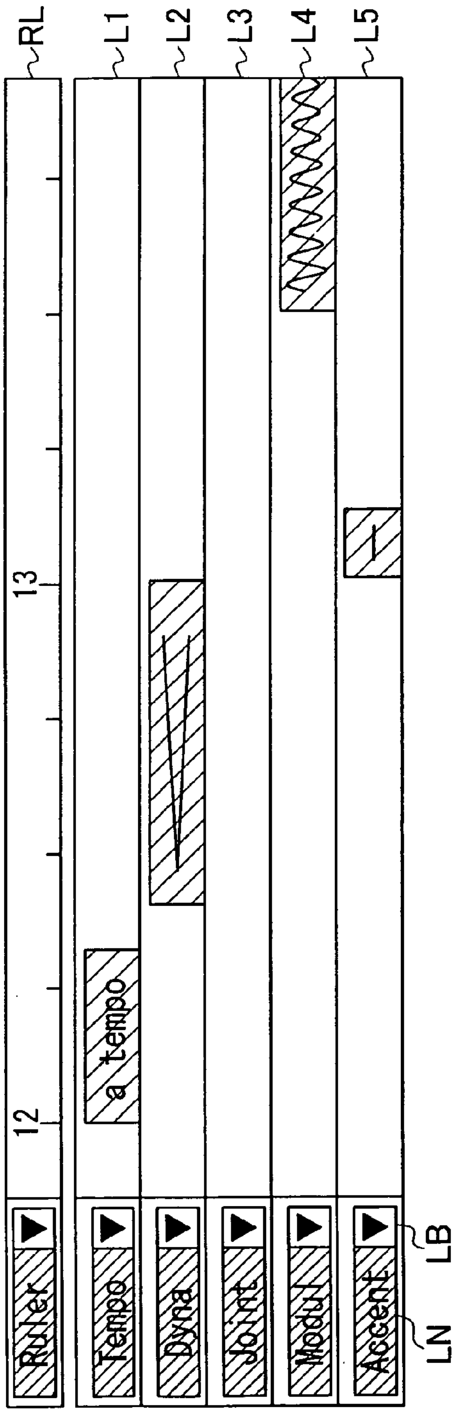
FIG. 3A shows selected layers of the score window shown in FIG. 2.
Figure 3B:
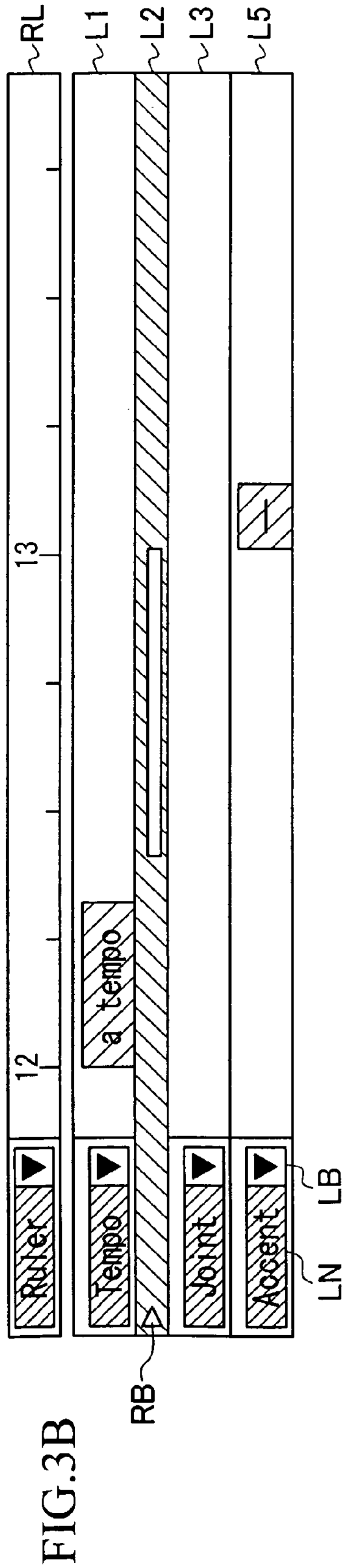
FIG. 3B shows selected layers of the score window, some of which are placed under commands of small-scale display and display-off.

FIGS. 3A and 3B show selected parts of the score window of FIG. 2, which are used to explain changes of the execution icon layers (L1–L5). Namely, FIG. 3A shows that all of the execution icon layers L1 to L5 are displayed on the screen in response to the display-on command, wherein each of the layers L1 to L5 contains a pair of the layer name display portion LN and layer operation button LB. This indicates that the each of the layers is an editable layer. In addition, each of the layers has a layer window (or score area) which extends in a rightward direction on the screen. When the user clicks the layer operation button LB of the dynamics icon layer L2 with the mouse, for example, the dynamics icon layer L2 is subjected to small-scale display as shown in FIG. 3B. Due to the small-scale display, the dynamics icon layer L2 is reduced in vertical size so that its display image (or content) is simplified in the layer window. Simplification in display allows that the user is capable of recognizing merely existence of an execution icon. Herein, the system disallows the user to edit the content of the layer which is subjected to small-scale display.

By employing such a small-scale display process, it is possible to hide details of the layer which an editor (i.e., user) who edits performance data does not have an intention to use. Herein, the process allows that the hidden layer is visible to the user. This eliminates possibilities in that the editor (or user) mistakenly regards the hidden layer to be inexistent one. Incidentally, an left end portion of the layer which is subjected to small-scale display does not provide the layer name display portion LN and layer operation button LB, which are replaced by a release button RB represented by a rightward-directing triangular symbol. By operating the release button RB, the dynamics icon layer L2 is restored from a small-scale display state (see FIG. 3B) to an original-scale display state (see FIG. 3A) which is realized by a display-on command.

Transition to or restoration from the small-scale display can be realized by display subcommands for small-scale display and display-on, which will be described later. Using the display subcommands, it is possible to actualize transition between display-on and display-off with respect to each of the layers. Giving a subcommand of display-off with regard to the modulation icon layer L4 shown in FIG. 3A, for example, the modulation icon layer L4 is deleted from the score window as shown in FIG. 3B.

[C] Display Commands

Figure 4:
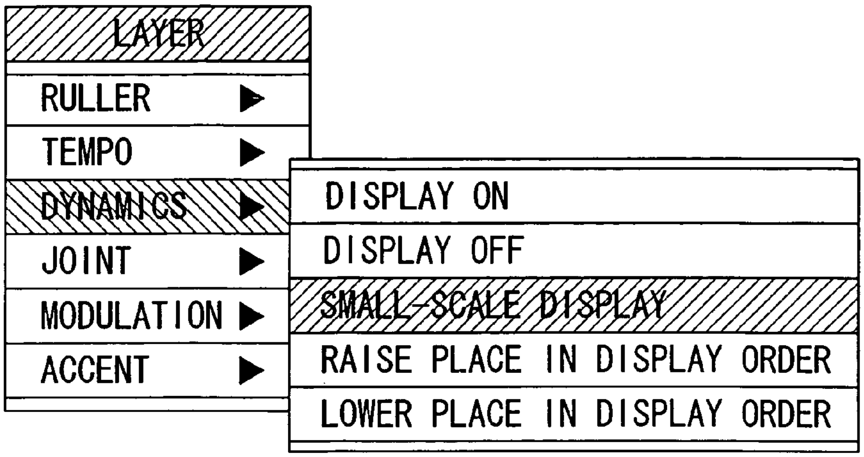
FIG. 4 shows an example of a command menu and its subcommand menu, which are displayed in connection with the score window of FIG. 2.

Using the aforementioned display subcommands, it is possible to realize transitions among display-on, small-scale display and display-off with respect to each of the layers. In addition, it is possible to perform a vertical rearrangement process in which the layers are rearranged in an order of vertical display locations. FIG. 4 shows an example of a command menu with regard to switching of layer display states. For example, when the user designates an area of "display command" which is placed in an upper left portion of the score window shown in FIG. 2, the system firstly shows a command menu (i.e., a left-side menu in FIG. 4) containing items (or commands) of "ruler", "tempo", . . . , "accent". If the user selects some item on the command menu, the selected item is highlighted in gray, so that a subcommand menu is additionally displayed on the right of the selected item. As shown in FIG. 4, the subcommand menu provides a list of subcommands for “display-on”, “display-off”, “small-scale display”, “raise place in display order” and “lower place in display order”. When the user selects any one of the subcommands, the system performs the selected subcommand. Herein, the selected subcommand is highlighted and is accompanied with a check mark “√” on the left. Incidentally, the system inhibits the user from editing execution icons with respect to the layers which are related to the display-off command and small-scale display command.

For example, if the user selects an item of “dynamics” from the command menu, the selected item (or command) is highlighted in gray so that a subcommand menu is displayed on the right as shown in FIG. 4. Then, if the user selects a subcommand of “small-scale display” from the subcommand menu, the system performs the selected subcommand of “small-scale display” with respect to the dynamics icon layer L2. Thus, as shown in FIG. 3B, the dynamics icon layer L2 is subjected to small-scale display. In addition, a check mark “√” is displayed on the left of the subcommand of “small-scale display” in the subcommand menu as shown in FIG. 4.

If the user selects a subcommand of “display-on”, the layer presently selected is subjected to normal-scale display. If the user selects a subcommand of “display-off”, the layer is deleted from the score window of FIG. 2. Consider a certain situation where under the display state of FIG. 3A, the user selects an item of “modulation” from the command menu, and the user also selects a subcommand of “display-off” from the subcommand menu. In that situation, the system performs the display-off command to delete the modulation icon layer L4 from the score window as shown in FIG. 3B. Herein, the system is not always required to completely delete the corresponding layer from the score window. In other words, it is possible to modify the system such that in response to the display-off subcommand, the corresponding layer is not completely deleted but its layer window is extremely reduced in vertical size such as to provide visuality for the user to recognize existence of the layer. In such modification, a check mark “√” is displayed on the left of the subcommand of “display-off” in the subcommand menu shown in FIG. 4.

As described above, the present system allows each of the layers to be subjected to display-on or display-off. Therefore, it is possible to display only the layers which the editor (or user) uses for editing performance data while hiding “unused” layers. This eliminates possibilities in that the user mistakenly imparts execution-related data to the unused layers. Thus, it is possible to improve performability in editing the performance data.

When the user selects a subcommand of “raise place in display order” on the subcommand menu, the system raises the corresponding layer by one place in the display order. When the user selects a subcommand of “lower place in display order” on the subcommand menu, the system lowers the corresponding layer by one place in the display order. Incidentally, vertical rearrangement of the layers is not necessarily performed using the aforementioned subcommands. That is, the vertical rearrangement can be actualized by effecting drag-and-drop operations of the mouse on a left end portion of each of the layers. Specifically, the user operates the mouse to perform drag-and-drop operations to move the layer name display portion LN of the layer (e.g., L1–L7) in a vertical direction, so that the layer is moved in display location to a dropped location on the score window of FIG. 2. By repeating the aforementioned drag-and-drop operations of the mouse with respect to the layers, it is possible to actualize total vertical rearrangement in display order of the layers. By the aforementioned vertical rearrangement of the layers in the display order, it is possible to form a preferred arrangement of the layers which the editor is capable of easily handling for editing the performance data, wherein a frequently-used layer can be placed just above a staff (i.e., staff icon layer SL), for example. Thus, it is possible to improve performability in editing the performance data.

[D] Operations of Execution Icons

The execution icons displayed in the execution icon layers (e.g., L1–L7) are corrected or modified by mouse operations on the score window of FIG. 2. Or, they are moved in display locations outside of the layer windows by drag-and-drop operations of the mouse. Thus, it is possible to delete execution-related data corresponding to the execution icons from the performance data. In this case, it is possible to use an icon modify window of FIG. 5 which is used to modify details of icons. Herein, the system calls the icon modify window being superimposed on the score window in a multi-window form. Using the icon modify window, it is possible to modify each of the execution icons in detail. In addition, it is possible to use an icon select palette of FIG. 6A by which the user is capable of changing the execution icon or newly attaching an execution icon onto the score window.

[E] Movement of Icons in Layers

In the score window of FIG. 2, the user is capable of operating the mouse to grab approximately a center portion of the execution icon being displayed in the execution icon layer (e.g., L1–L7), which allows the execution icon to move in a horizontal direction on the screen. By grabbing an end portion of the execution icon with the mouse, it is possible to stretch the execution icon in the horizontal direction on the screen. If stretching is performed on one end of the execution icon, another end of the execution icon is fixed in display location without being stretched.

Figure 5:
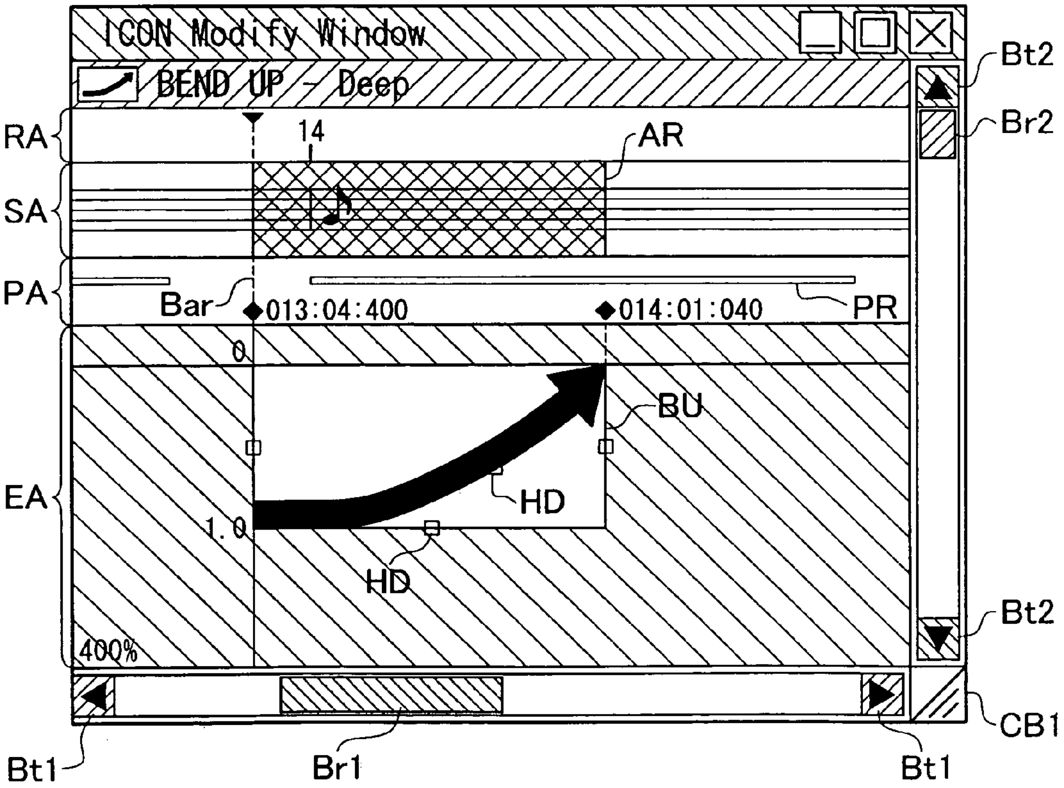
FIG. 5 shows an example of an icon modify window which allows a user to modify an execution icon in the performance data editing system.

The user is capable of moving the execution icon outside of the layer window of the execution icon layer (e.g., L1–L7), or the user is capable of moving the execution icon outside of all the layer windows of the execution icon layers (excluding the icon modify window of FIG. 5). In that case, the system deletes the execution icon which is moved outside of the layer window(s), so that the corresponding execution-related data is deleted from the performance data. That is, the present embodiment employs a special execution icon deletion process, which provides simple operations for the user to delete execution-related data and which eliminates necessities in that the user is conventionally required to perform troublesome operations in deletion such as following ones:

(i) To select a command of “delete” from a command menu; and (ii) To move an icon of execution-related data onto an area of “trash can icon”.

When the user merely moves the execution icon close to an end of the layer window, the system inhibits the execution icon deletion process from being automatically performed, so that the system slowly scrolls the score window on the screen.

[F] Icon Modify Window

In the score window of FIG. 2, various execution icons are attached onto the execution icon layers (e.g., L1–L7) which are displayed in connection with a staff or score displayed in the staff icon layer SL. When the user performs prescribed operations such as "double clicks" on any one of the execution icons with the mouse, the system opens an icon modify window that allows the user to edit corresponding execution-related data on the screen. Using such an icon modify window (see FIG. 5), the user is capable of editing execution-related data corresponding to the execution icon which the use double clicks with the mouse. In FIG. 2, a bend-up icon BU is displayed approximately at a center of the layer window of the attack icon layer L6 in connection with a fourteenth bar (i.e., a bar or measure whose serial number in the performance data is "14"). If the user selects the bend-up icon BU as an editing subject by double clicks with the mouse, the system opens an icon modify window for the bend-up icon BU (see FIG. 5), which is displayed in a multi-window form. Herein, the icon modify window can be superimposed on a certain display area overlapping with the score window, or it can be displayed in parallel with the score window. As described above, the user performs the prescribed operations such as double clicks with the mouse on the execution icon displayed in the execution icon layer (L1–L7), so that the system opens a window specially designed for modification of details of the execution icon, by which it is possible to modify the execution-related data with ease.

As shown in FIG. 5, the icon modify window contains four areas, namely, a bar ruler area RA, a (staff) notation display area SA, a plain piano roll display area PA for displaying a plain piano roll PR and an edit area EA for editing an execution icon. Herein, the notation display area SA and plain piano roll display area PA configure a modify-incorporated score area used for displaying a selected part of the score shown in FIG. 2. The bar ruler area RA and notation display area SA roughly correspond to the aforementioned bar ruler layer RL and staff (notation) icon layer SL in FIG. 2 respectively. As compared with those layers RL and SL, the areas RA and SA are magnified in time scale and horizontal dimension. The notation display area SA displays a magnified version of a staff or stave which is created by magnifying a part of the staff displayed in the staff icon layer SL so much. The icon modify window also installs left/right scroll buttons Bt1 and a left/right scroll bar Br1 which are displayed horizontally on a bottom area as well as up/down scroll buttons Bt2 and an up/down scroll bar Br2 which are displayed vertically on a right end area. Using the left/right scroll buttons Bt1 or the left/right scroll bar Br1, it is possible to horizontally scroll all the areas RA, SA, PA and EA with respect to time. Using the up/down scroll buttons Bt2 or the up/down scroll bar Br2, it is possible to vertically scroll the areas RA, SA, PA and EA. In addition, the icon modify window further installs a corner button CB1, which is operated to allow expansion of the icon modify window in a downward direction and/or a rightward direction on the screen.

By changing a display location of a note which is attached to a staff in the notation display area SA, it is possible to change a pitch of the note. In the plain piano roll display area PA, the plain piano roll PR indicates a start time and an end time of the note, displayed in the notation display area SA, by left and right ends thereof. So, the start time of the note can be changed by moving the left end of the plain piano roll PR in a leftward or rightward direction with respect to time, while the end time of the note can be changed by moving the right end of the plain piano roll PR in a leftward or rightward direction with respect to time. Namely, the user is capable of changing the start time and/or end time of the note by using the plain piano roll PR. In that case, it is possible to design the system such that a note symbol is automatically changed in conformity with the plain piano roll PR which is changed in time duration over a prescribed range. For example, if the user reduces the plain piano roll PR in time duration to some extent, an eighth note is automatically changed to a sixteenth note. In addition, when the user changes the start time and/or end time of the note by using the plain piano roll PR, the system correspondingly modifies the execution icon used for the note with respect to time. That is, the modify-incorporated score area consisting of the areas SA, PA displays a part of the score in connection with a designated execution icon under modification to allow modification of a designated note. When the user completes modification on the note in the modify-incorporated score area, content of the modification is reflected on note data and/or execution-related data as well. This allows the user to perform a variety of modifications on the execution-related data within the icon modify window.

The edit area EA magnifies and displays an execution icon (e.g., a bend-up icon BU shown in FIG. 5), which is designated by double clicks on the mouse in the score window of FIG. 2 and which is being edited by the user. A number of handlers (or handles) HD which are little blank-square boxes (□) are located at selected locations of the execution icon (e.g., BU) to give places to grab with the mouse. By moving those handlers HD with the mouse, it is possible to modify parameters of the execution icon and edit the execution-related data.

In the score window of FIG. 2 and the icon modify window of FIG. 5, a netted portion AR gives a visual indication of a range of the execution-related data, corresponding to the execution icon being presently selected or edited, in the score. That is, the range of the execution-related data being presently selected or edited is displayed in the staff notation of the staff icon layer SL and is also displayed in the staff notation of the notation display area SA. This allows the user to easily recognize a relationship between the note and execution-related data under modification.

In the case of the bend-up icon BU shown in FIG. 5, there are provided five handlers HD, namely, left/right handlers, a lower handler and an internal handler. Herein, the left/right handlers are located at selected positions on left and right ends of the bend-up icon BU, and the lower handler is located at a mid-point on a lower end of the bend-up icon BU. In addition, the internal handler is located at a selected position on a prescribed image (e.g., curved arrow) of the bend-up icon BU. The user is capable of grabing the left/right handlers to horizontally drag and move them with the mouse in left/right directions with respect to time. Herein, a start timing is modified by moving the left handler, while an end timing is modified by moving the right handler. The tune progression bar Bar follows up with the start time of the execution icon (e.g., BU). In addition, the user is capable of grabing the lower handler to vertically drag and move it with the mouse in up/down directions with respect to magnitude, so that a value of a depth is being modified. Further, the user is capable of grabbing the internal handler to drag and move it with the mouse, so that a manner of variations of the bend-up execution is being modified. In response to the aforementioned modifications, it is possible to modify prescribed icon parameters such as the start timing and end timing of the bend-up execution being effected on the note. In order to ease modifications, the system is capable of automatically expanding sizes of the handlers when the user moves a mouse cursor (or mouse pointer)

close to the handlers respectively. This allows the user to perform editing operations with ease. Due to the editing operations, a small change is caused to occur on a display shape of the execution icon in response to the execution parameters being edited. Thus, the user is capable of easily recognizing an outline of the execution-related data being edited by simply watching the display shape of the execution icon.

The aforementioned editing operations of the execution icon can be implemented by "snapping" values of the parameters. In general, smooth movements of the mouse cause consecutive variations of parameter values, whilst "snapping" cause step variations of parameter values which are changed at intervals such as 0→5→10→15→ . . . This allows the user to edit the parameters more easily. Specifically, a snap process is implemented by setting an initial value and a step value for variations of parameter values, which are registered in advance in connection with mouse movements. Due to such a snap process, the mouse pointer does not move continuously on the screen, but it snaps and easily stops at prescribed locations which correspond to the initial value and increments of the step value. Variations of the parameter values are caused by increasing or decreasing the parameter values in proportion to coordinates of the execution icon. Herein, a display size of the execution icon in the icon modify window changes in proportion to magnitude of the execution icon. For example, if the user edits the bend-up icon BU (see FIG. 5) to actualize a one-tone bend by imparting a half-tone bend in depth, the icon modify window displays in the edit area EA the edited bend-up icon with a double size, which is double of an original size in a vertical direction.

[G] Icon Select Palette

When the user operates a button of "palette" which is displayed in an upper left portion of the score window of FIG. 2, the system opens a menu for "icon select palettes" corresponding to musical instruments or else. When the user selects a desired musical instrument such as a saxophone on the menu, the system reads out an icon select palette (see FIG. 6A) exclusively used for the saxophone. Such an icon select palette (i.e., "ICON Palette (Sax)" of FIG. 6A) is displayed in a multi-window form together with the score window and icon modify window. Herein, the icon select palette can be superimposed on a certain display area overlapping with the score window or else, or it can be displayed in parallel with the score window or else. Incidentally, it is possible to read out information of the icon select palette in response to a readout command at an arbitrary timing as described above, or it is possible to automatically read out the information of the icon select palette in response to a start of application programs regarding performance data editing processes.

Each of the musical instruments is connected with groups of execution icons in advance. Hence, the icon select palette regarding a specific musical instrument (e.g., saxophone) shows those groups of the execution icons, which are sequentially arranged in a vertical direction on the screen. With respect to each group, there are provided a state indication/operation button ST, execution icons (i.e., high-order execution icons MS1, MS2, MS3) and a group expansion button GB which are arranged in a lateral direction on the screen. On an upper right portion of the icon select palette, there are provided various types of icon use buttons PB such as an "apply" button, a "save" button and a "load" button (not shown). Each of the icon use buttons PB is displayed or not displayed in the icon select palette according to needs. On a bottom portion of the icon select palette, there are provided left/right scroll buttons Bt3 and a left/right scroll bar Br3, which are used to scroll the execution icons being displayed on the screen in a horizontal direction. On a right end portion of the icon select palette, there are provided up/down scroll buttons Bt4 and an up/down scroll bar Br4, which are used to scroll the execution icons being displayed on the screen in a vertical direction. On a lower-right corner of the icon select palette, there is provided a corner button CB2 which is used to expand a display range of the icon select palette.

The execution icons belonging to each execution icon group are sequentially shown on the right of the state indication/operation button ST which indicates a state of the execution icon group by a prescribed letter such as "A" (representing "attack") and "R" (representing "release"). The state indication/operation buttons having no letters show that their corresponding execution icons are related to bodies or broad ranges with respect to sounds of the musical instrument. Like the aforementioned layer operation buttons LB shown in FIG. 2, the state indication/operation buttons ST are subjected to drag-and-drop operations of the mouse for actualization of vertical rearrangement. That is, the user is capable of performing the drag-and-drop operations on the state indication/operation buttons ST with the mouse to vertically rearrange places of the execution icon groups in a vertical display order in the icon select palette.

On the right of the state indication/operation buttons ST, there are arranged various executions (or articulations) in a horizontal direction in the icon select palette, which contains six rows corresponding to six execution icon groups respectively. As for a second row corresponding to a group of bend-up icons, for example, there are horizontally arranged various bend-up icons which differ from each other in velocity (or duration) and depth. Using the icon select palette, the user is capable of attaching a desired execution icon at a desired position on the score window of FIG. 2 in accordance with the following operations:

At first, the user clicks the "apply" button within the icon use buttons PB displayed on the upper left portion of the icon select palette. Then, the user selects a desired execution icon from among the execution icons of the icon select palette. That is, the user performs drag-and-drop operations on the desired execution icon with the mouse, so that the desired execution icon is being attached to the desired position on the score window. In this case, the execution icon being presently selected is indicated by a shade display like a first high-order bend-up icon (MS1) shown in second row, first column of the icon select palette, for example.

When the user opens the icon select palette, the icon select palette initially shows execution icons which are previously selected in the past and which are arranged from the left to the right as high-order execution icons in an up-to-date order with respect to each of the execution icon groups, so that an execution icon which is newest one being selected is normally shown in a leftmost portion as a first high-order execution icon (MS1). The icon select palette of FIG. 6A normally shows three new execution icons, namely, a first high-order execution icon MS1, a second high-order execution icon MS2 and a third high-order execution icon MS3, with respect to each execution icon group, wherein the first high-order execution icon MS1 displayed in the leftmost portion is the newest one. In other words, the icon select palette is designed to show plural execution icons which are latest selections with respect to each of the execution icon groups. So, although the icon select palette is displayed in a small display area, it is possible to normally show important execution icons which the editor (or user) frequently uses for editing the performance data. Thus, it is possible to improve performability in editing the performance data.

The external storage device 9 (and the RAM 3) has an icon palette memory area that registers in advance all "selectable" execution icons in an up-to-date order with respect to each of the execution icon groups. Details of the icon select palette being saved on the icon palette memory area is mainly classified into two contents, namely, "overall content" and "group content". The overall content is related to various items such as "names of musical instruments", "number (n) of maximally registerable groups", "group order (in vertical arrangement of groups)" and "number of icons displayed in rows and columns", wherein a default number is given as "six rows by three columns", for example. The group content is related to a number of selecting execution icon IDs in the past, which is limited to a maximal number "m" (where m=9), for example.

Incidentally, the user is capable of grabbing the corner button CB2 of the icon select palette to drag it in some direction with the mouse, so that a palette size (i.e., display range of the icon select palette) is being changed. Or, the user is capable of grabbing a lower edge UE of the icon select palette to drag it in a vertical direction with the mouse, so that the palette size is being changed in the vertical direction. Or, the user is capable of grabbing a right edge RE of the icon select palette to drag it in a horizontal direction with the mouse, so that the palette size is being changed in the horizontal direction. For example, when the user grabs the lower edge UE to stretch the icon select palette in a downward direction with the mouse, it is possible to increase a number of execution icon groups being displayed in the icon select palette. In addition, when the user grabs the right edge RE to stretch the icon select palette in a rightward direction, it is possible to increase a number of execution icons being displayed in the icon select palette. In consideration of performability in editing the performance data in association with a computer display, it is preferable that the icon select palette contains minimally six rows (i.e., six execution icon groups) and minimally three columns (i.e., three icons in each group), wherein it is possible to increase a number of columns up to nine (i.e., maximally nine icons in each group).

In order to stretch or shrink the icon select palette in palette size, it is preferable that the icon select palette is increased or decreased in size by each unit corresponding to one execution icon in vertical and horizontal dimensions. For example, it is possible to stretch or shrink the icon select palette in a range of six to n units in vertical dimension, wherein "n" denotes a number of execution icon groups which can exist for the musical instrument (e.g., saxophone). If the number of "existing" execution icon groups is less than "n", nonexistent groups are grayed on the screen. In addition, it is possible to stretch or shrink the icon select palette in a range of three to m units in horizontal dimension, wherein "m" (e.g., m=9) denotes a number of execution icons which can exist for each execution icon group. If the number of "existing" execution icons in each execution icon group is less than "m", nonexistent icons are grayed on the screen.

The left/right scroll buttons Bt3 and the left/right scroll bar Br3 are used to horizontally scroll the execution icons which are registered with the aforementioned icon palette memory area and which are arranged in an up-to-date order, in which newly used icons are arranged in high (or left) places, in connection with the execution icon groups respectively. In addition, the up/down scroll buttons Bt4 and the up/down scroll bar Br4 are used to vertically scroll the execution icon groups which are vertically arranged in a prescribed order. Those buttons Bt4 and bar Br4 are used to change the order of vertical arrangement of the execution icon groups on the icon select palette. By watching a position of the left/right scroll bar Br3, the user is capable of sensing a range of the execution icons being presently displayed within the execution icon groups on the icon select palette. By watching a position of the up/down scroll bar Br4, the user is capable of sensing a range of the execution icon groups being presently displayed on the icon select palette.

The group expansion button GB is used to call a set of "selectable" execution icons on the screen with respect to each execution icon group. If the user operates the group expansion button GB of a second execution icon group whose state is "attack" or "A" in second row on the icon select palette, for example, the system displays on the screen an icon group small window of FIG. 6B which expands the execution icons (e.g., bend-up icons) belonging to the second execution icon group. That is, the icon group small window shows an arrangement of execution icons, which belong to the designated execution icon group and which are arranged in a matrix form in accordance with prescribed conditions. Among the execution icons of the icon group small window, selected execution icons which have been already selected are displayed with shade. Incidentally, an execution icon which is presently under edit in the icon modify window (see FIG. 5) is called a "custom icon", which is derived from its original icon. In connection with such a custom icon, its original icon is displayed with shade in the icon group small window.

Figure 6A:
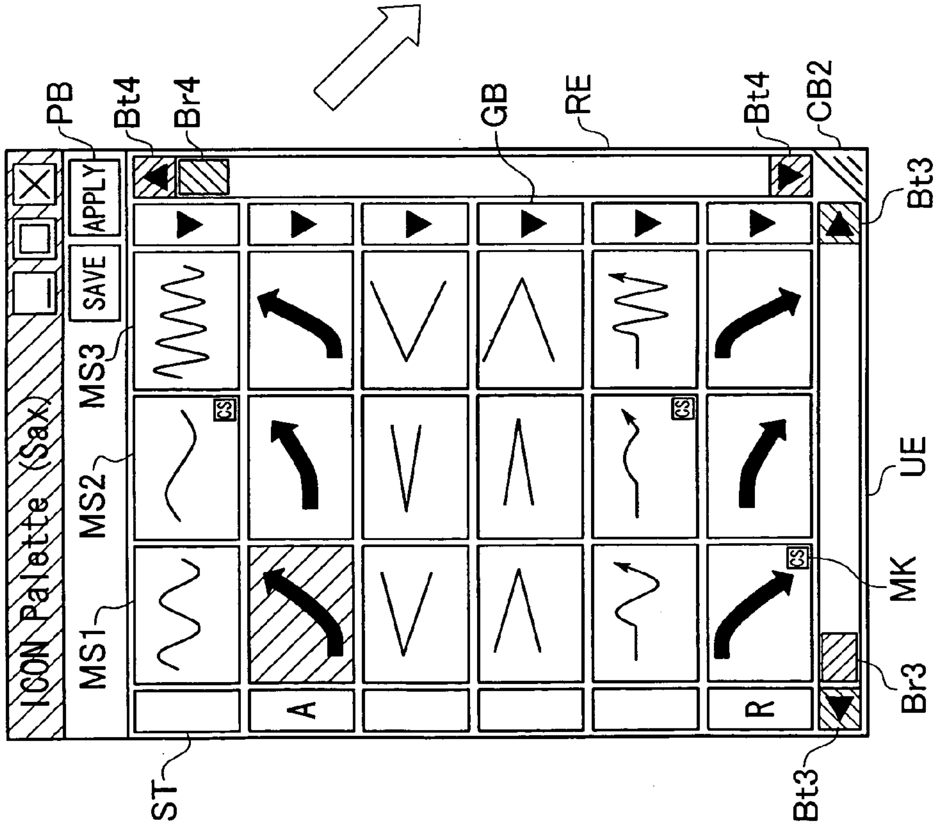
FIG. 6A shows an example of an icon select palette for selection of execution icons.
Figure 6B:
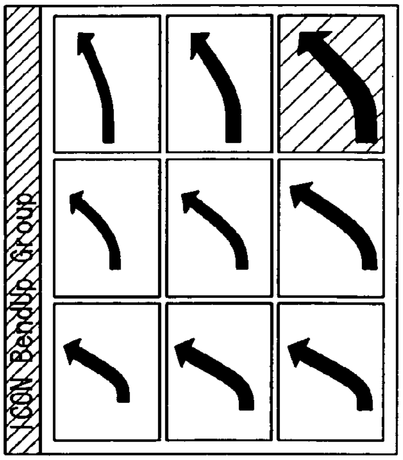
FIG. 6B shows an example of an icon group small window, which is expanded from an execution icon group being designated on the icon select palette.

The execution icon corresponding to the execution-related data which are presently under edit on the icon modify window of FIG. 5 is displayed in gray in the icon select palette of FIG. 6A and the icon group small window of FIG. 6B. After completion of the edit, when the user operates an execution button (not shown) which is provided in the icon modify window, the execution icon is modified in response to edited parameter values in the score window of FIG. 2. Thus, the execution icon is delicately modified in shape in response to the edited parameter values.

After completion of the edit, when the user operates the save button within the icon use buttons PB displayed in the upper right portion of the icon select palette of FIG. 6A, the execution icon whose parameters are edited is additionally registered with the icon palette memory area of the external storage device 9 (and the RAM 3) as a new first high-order execution icon (MS1) of the corresponding execution icon group on the icon select palette. Herein, if addition of the new icon cause overflow by which a total number of execution icons exceeds a maximal number "m" for the execution icons which can be maximally registered with respect to the execution icon group, an execution icon ranked in a lowest place in order is being deleted to allow addition of the new icon. That is, the edited execution icon is newly displayed as the first high-order execution icon MS1 for the execution icon group on the icon select palette. In this case, if the execution icon is newly modified on the icon modify window of FIG. 5, modification is reflected on a shape of the execution icon, in other words, an icon symbol (e.g., arrows, dynamics symbols, etc.) indicated inside of the execution icon is modified in shape. For example, if the execution icon is stretched in time dimension, the execution icon is modified in shape such that an icon symbol thereof is stretched in horizontal dimension. In addition, a customize mark MK (see letters "CS" in a small box in FIG. 6A) is attached to a lower-right corner of an area of the edited execution icon. A save process of information of the icon select palette can be performed at an arbitrary timing in response to a save command as described above, or it can be compulsorily performed after the user ends application programs.

In the present embodiment, the execution icon corresponding to the execution-related data being edited on the icon modify window is regarded as a new execution icon, which is discriminated from its original execution icon by using the aforementioned customize mark MK. That is, a customize display is effected to provide clear distinction on the edited execution icon corresponding to the edited execution-related data. Hence, the edited execution-related data can be used for another part of the performance data or other performance data. In addition, the user is capable of easily judging that the edited execution-related data differ from its original execution-related data.

[H] Preparation of Various Types of Execution Icons

Various execution manners are provided for specific types of execution icons (e.g., dynamics symbols such as crescendo and diminuendo) which are attached to areas over plural notes. Those execution manners for crescendo icons and diminuendo icons will be described with reference to FIGS. 7A to 7J and FIGS. 8A to 8J. Specifically, FIGS. 7A to 7J show a variety of crescendo icons, which are mainly classified into two groups, namely, a crescendo linear group (see FIGS. 7A to 7F) and a crescendo nonlinear group (see FIGS. 7G to 7J). Herein, the crescendo linear group contains crescendo icons which provide linear variations in tone volumes, while the crescendo nonlinear group contains nonlinear (or curved) variations in tone volumes.

Figures 7A, 7B, 7C, 7D, 7E, 7F, 7G, 7H, 7I, 7J:
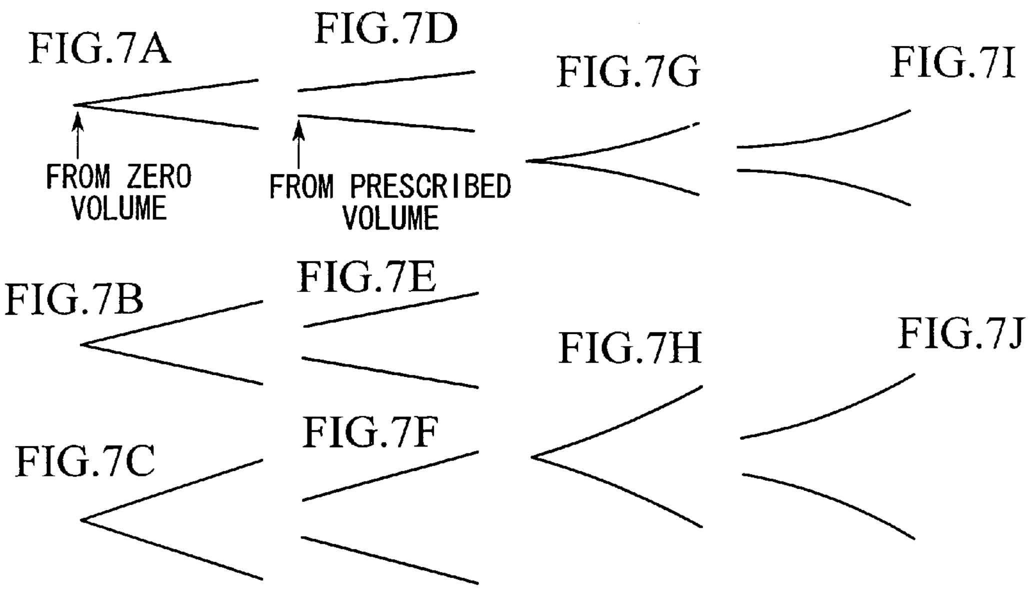
FIGS. 7A to 7F show symbols of crescendo icons belonging to a crescendo linear group.
FIGS. 7G to 7J show symbols of crescendo icons belonging to a crescendo nonlinear group.

It is convenient for the user to provide each of the crescendo linear group and crescendo nonlinear group with different types of icons in connection with starting tone volumes. As for the crescendo linear group, FIGS. 7A to 7C show "zero-start" crescendo icons by which musical tones are gradually increasing in tone volumes from zero, while FIGS. 7D to 7F show "non-zero-start" crescendo icons by which musical tones are gradually increasing in tone volumes from prescribed tone volumes. As for the crescendo nonlinear group, FIGS. 7G and 7H show "zero-start" crescendo icons by which musical tones are gradually increasing in tone volumes from zero, while FIGS. 7I and 7J show "non-zero-start" crescendo icons by which musical tones are gradually increasing in tone volumes from prescribed tone volumes. Thus, the present embodiment provides the user with those two types of icons, i.e., zero-start crescendo icons and non-zero-start crescendo icons, as selectable crescendo icons on the icon select palette in advance.

Figures 8A, 8B, 8C, 8D, 8E, 8F, 8G, 8H, 8I, 8J:
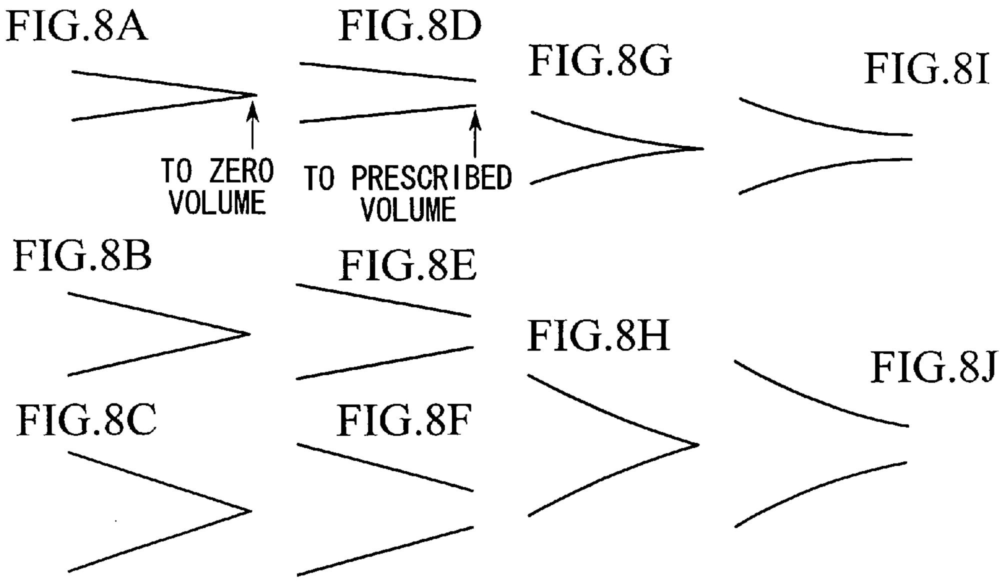
FIGS. 8A to 8F show symbols of diminuendo icons belonging to a diminuendo linear group.
FIGS. 8G to 8J show symbols of diminuendo icons belonging to a diminuendo nonlinear group.

FIGS. 8A to 8J show a variety of diminuendo icons, which are mainly classified into two groups, namely, a diminuendo linear group (see FIGS. 8A to 8F) and a diminuendo nonlinear group (see FIGS. 8G to 8J). It is convenient for the user to provide each of the diminuendo linear group and diminuendo nonlinear group with two types of icons in connection with ending tone volumes. As for the diminuendo linear group, FIGS. 8A to 8C show "zero-end" diminuendo icons by which musical tones are gradually decreasing in tone volumes to zero, while FIGS. 8D to 8F show "non-zero-end" diminuendo icons by which musical tones are gradually decreasing in tone volumes to prescribed tone volumes. As for the diminuendo nonlinear group, FIGS. 8G and 8H show "zero-end" diminuendo icons by which musical tones are gradually decreasing in tone volumes to zero, while FIGS. 8I and 8J show "non-zero-end" diminuendo icons by which musical tones are gradually decreasing in tone volumes to prescribed tone volumes. Thus, the present embodiment provides those two types of icons, i.e., zero-end diminuendo icons and non-zero-end diminuendo icons, as selectable diminuendo icons on the icon select palette in advance.

In summary, different types of icons are provided for representation of the zero-start crescendo icons and non-zero-start crescendo icons respectively, so that the user is capable of adequately using those icons to suit to needs with ease. In addition, different types of icons are provided for representation of the zero-end diminuendo icons and non-zero-end diminuendo icons respectively, so that the user is capable of adequately using those icons to suit to needs with ease.

[I] Mouse Operation Process

Figure 9:
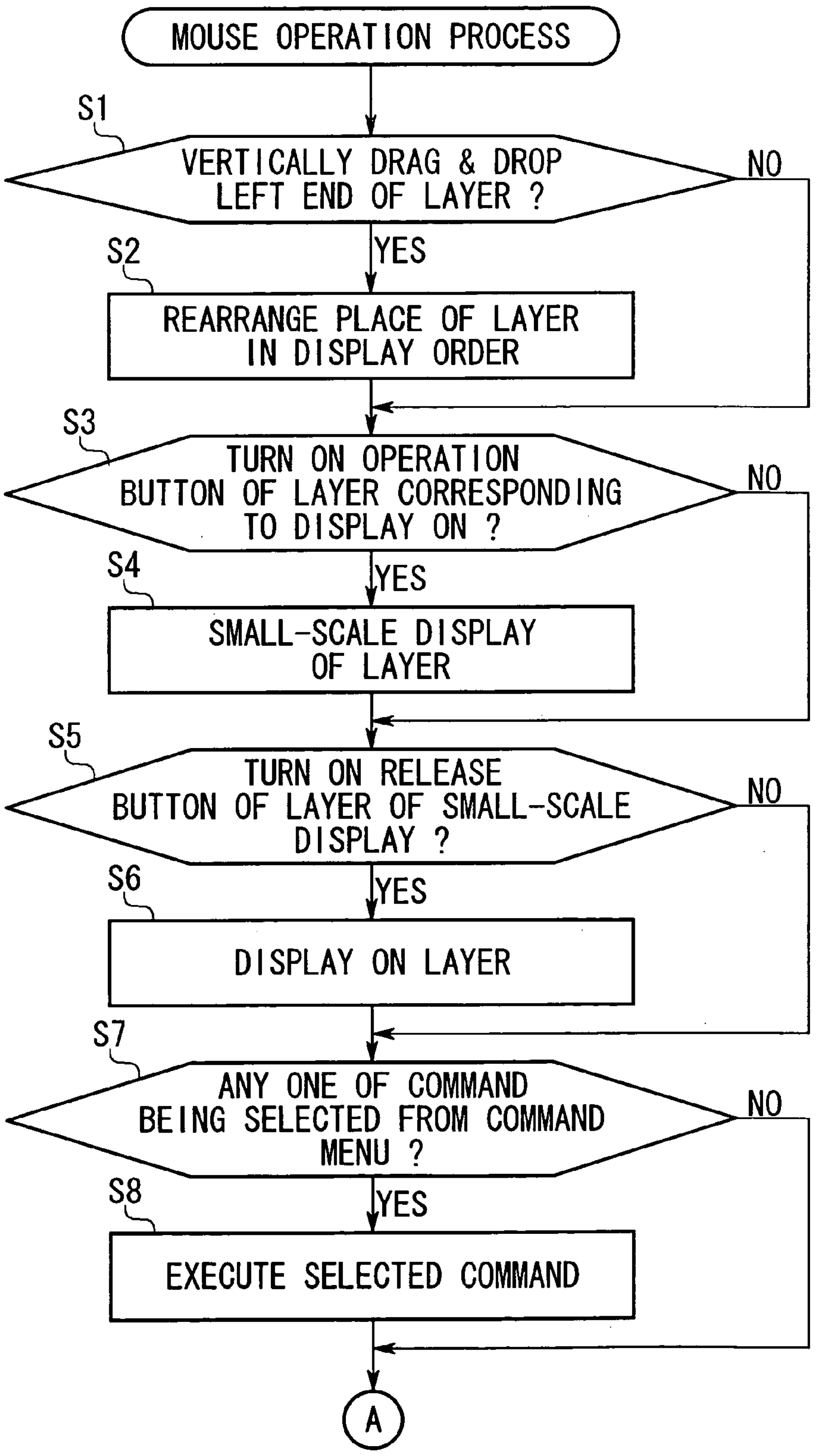
FIG. 9 is a flowchart showing a first part of a mouse operation process in accordance with the embodiment of the invention.
Figure 10:
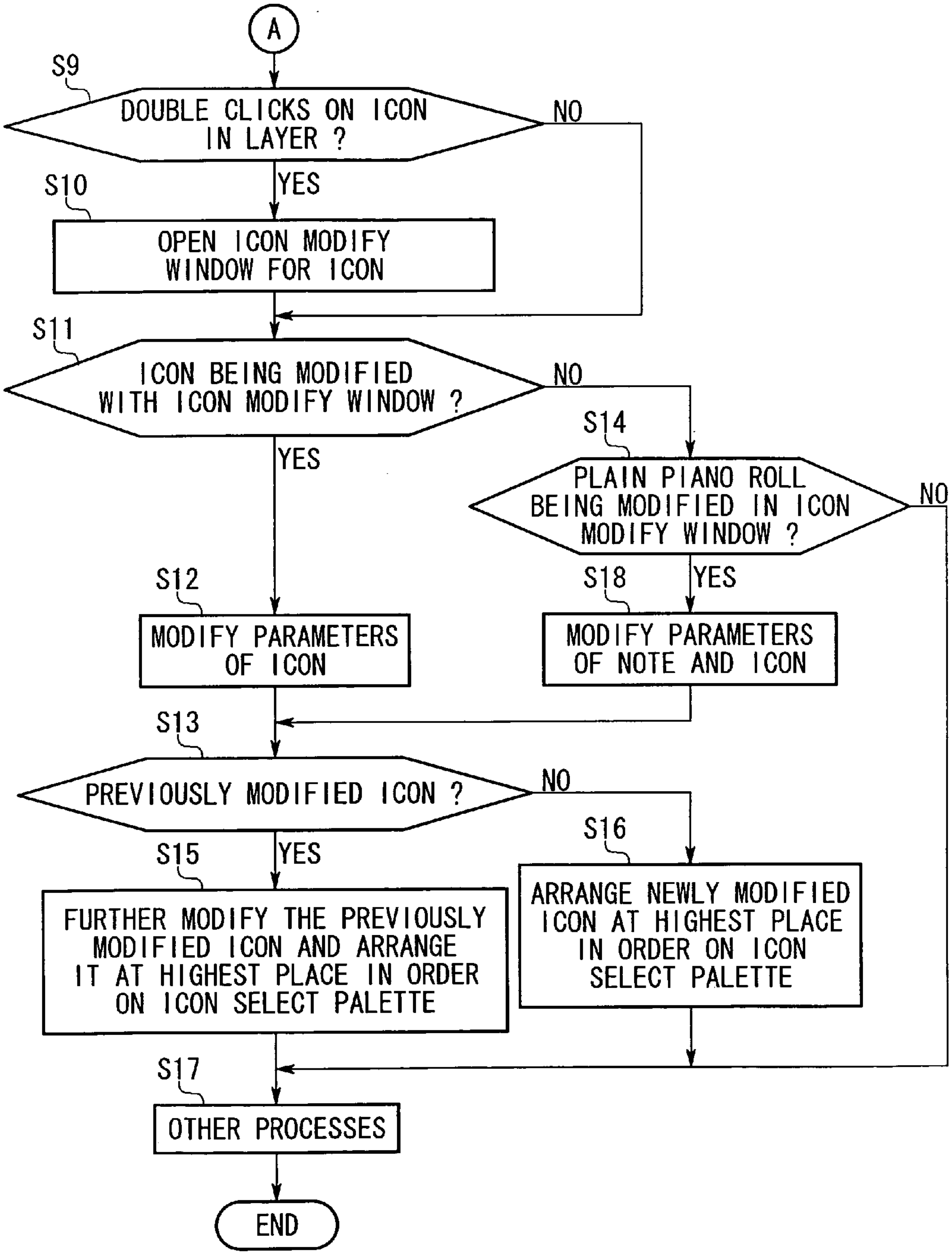
FIG. 10 is a flowchart showing a second part of the mouse operation process in accordance with the embodiment of the invention.

FIGS. 9 and 10 are flowcharts showing a mouse operation process in accordance with the embodiment of the invention. A main process routine (not shown) causes the system to display the score window of FIG. 2 on the screen of the display 14, which allows the user to edit performance data. In this case, when the system detects that the user operates the operation device 13 (i.e., mouse), the system initiates the mouse operation process. On the score window, necessary steps and operations can be implemented in response to mouse operations such as designation of portions or areas being pointed by the mouse pointer and drag-and-drop operations. For example, when the user designates a layer name display portion LN, which is displayed on a left end portion of a layer (e.g., L1–L7), with the mouse, the designated layer is set as a subject which is moved in display location within the score window on the screen.

Firstly, a flow goes to step S1 in which the system makes detection as to whether the user performs drag-and-drop operations on a layer name display portion LN of a certain layer (e.g., L1–L7) with the mouse to move it in a vertical direction on the score window or not. If the drag-and-drop operations of the mouse are effected on the layer name display portion LN of the layer in an upward or downward direction (i.e., an arrangement direction of layers), in other words, a decision result of step S1 is "YES", the flow proceeds to step S2 in which the system moves the layer in display location toward a dropped position, so that the layer is rearranged in place of display order on the score window. Then, the flow proceeds to step S3. On the other hand, if no drag-and-drop operations are effected on any one of the layer name display portions LN of the layers (e.g., L1–L7), in other words, if the decision result of step S1 is "NO", the flow proceeds directly to step S3.

In step S3, the system makes detection as to whether the user turns on a layer operation button LB (indicated by a symbol of a reverse black triangle "▼") which is incorporated in the layer name display portion LN with the mouse or not. If the user clicks the layer operation button LB with the mouse, in other words, if a decision result of step S3 is "YES", the flow proceeds to step S4 in which the layer is subjected to small-scale display so that the score window show only existence of an icon (or icons) related to the layer. Then, the flow proceeds to step S5. Consider that the user clicks the layer operation button LB of the dynamics icon layer L2 shown in FIG. 2 or FIG. 3A with the mouse, for example. In that case, the dynamics icon layer L2 is subjected to small-scale display as shown in FIG. 3B, wherein a release button RB (indicated by a rightward-directing triangle symbol) is displayed in a left end portion. If the step S3 does not detect that the layer operation button LB is turned on, in other words, if the decision result of step S3 is "NO", the flow proceeds directly to step S5.

In step S5, a decision is made as to whether the user turns on the release button RB at the left end portion of the layer (e.g., L2) of the small-scale display or not. If the user clicks the release button RB with the mouse so that a decision result of step S5 is "YES", the flow proceeds to step S6 in which the small-scale display of the layer is released so that the layer is restored in a normal-scale display mode. Then, the flow proceeds to step S7. For example, if the user clicks the release button RB of the layer L2 shown in FIG. 3B with the mouse, the score window is restored as shown in FIG. 2 or FIG. 3A wherein the layer L2 is displayed in a normal scale. If the step S5 does not detect that the release button RB is turned on, the flow proceeds directly to step S7.

In step S7, a decision is made as to whether the user selects any one of the items (or commands) on the command menu shown in FIG. 4 or not. If the step S7 detects that any one command is selected by the user, in other words, if a decision result of step S7 is "YES", the flow proceeds to step S8 in which the system executes the selected command. Then, the flow proceeds to step S9. Consider that as shown in FIG. 4, the user selects an item (or command) of "dynamics" on the command menu. In that case, the selected item is grayed while the system displays the subcommand menu on the right of the command menu. As described before, the subcommand menu shows five subcommands with regard to "display-on", "display-off", "small-scale display", "raise place in display order" and "lower place in display order". If the user clicks a mouse button to designate the subcommand of "small-scale display" within the aforementioned subcommands, the score window of FIG. 2 or FIG. 3A is changed as shown in FIG. 3B wherein the dynamics icon layer L2 is subjected to small-scale display. In addition, the system displays a check mark "√" on the left of the subcommand of "small-scale display" in the subcommand menu. If the step S9 does not detect that the user designates a specific command on the command menu of FIG. 4, in other words, if a decision result of step S9 is "NO", the flow proceeds directly to step S9 shown in FIG. 10.

In step S9, a decision is made as to whether the user double clicks a mouse button on any one execution icon in any one of the execution icon layers (e.g., L1–L7) in the score window of FIG. 2 or not. If the user double clicks the mouse button on any one execution icon so that a decision result of step S9 is "YES", the flow proceeds to step S10 in which the system opens an icon modify window of FIG. 5 with respect to the execution icon. Then, the flow proceeds to step S11. If the step S9 does not detect that the user double clicks the mouse button on any one execution icon, in other words, if the decision result of step S9 is "NO", the flow proceeds directly to step S11. Consider that the user double clicks the mouse button on a bend-up icon BU which is displayed approximately at a center of the layer window of the attack icon layer L6 in connection with a timing of a fourteenth bar (14) on the score window of FIG. 2. In that case, the system opens the icon modify window of FIG. 5 with respect to the bend-up icon BU in a multi-window form on the score window. Herein, the icon modify window can be superimposed on a certain display area overlapping with the score window, or it can be displayed in parallel with the score window on the screen.

In step S11, a decision is made as to whether modification is effected on the execution icon (e.g., bend-up icon BU) in the icon modify window or not. If the user effects modification on the execution icon so that a decision result of step S11 is "YES", the flow proceeds to step S12 in which parameters of the execution icon are being modified. Then, the flow proceeds to step S13. If the step S11 does not detect that the user effects modification on the execution icon, in other words, if the decision result of step S11 is "NO", the flow proceeds directly to step S14.

When the user performs double clicks to select a certain execution icon (e.g., bend-up icon BU) with the mouse, the selected icon is subjected to the foregoing step S10 by which it is magnified and displayed in the edit area EA of the icon modify window as shown in FIG. 5. In the edit area EA, an icon symbol (e.g., gradually raising arrow) of the selected icon (e.g., bend-up icon BU) is encompassed by frame lines, to which the foregoing handler HD (represented by little boxes) are attached. That is, three handlers are attached to three out of four frame lines of the selected icon, and one hander is attached at a selected position on the icon symbol. Herein, the user is capable of grabbing the handlers HD to drag them with the mouse in vertical dimension and/or horizontal dimension with respect to magnitude and/or time, so that the selected icon (BU) being magnified and displayed in the edit area EA is being modified. The step S12 allows the user to modify parameter values such as a bend-up start timing and a bend-up end timing in response to modifications effected on the selected icon (BU), for example.

The step S13 makes discrimination as to whether a presently edited icon whose parameters are modified in the step S12 matches with a previously modified icon whose parameters have been already modified or a newly modified icon whose parameters are newly modified. If the presently edited icon matches with the previously modified icon so that a decision result of step S13 is "YES", the flow proceeds to step S15. If the presently edited icon matches with the newly modified icon so that the decision result of step S13 is "NO", the flow proceeds to step S16. After completion of the step S15 or S16, the flow proceeds to step S17.

That is, if the user newly modifies parameters of the icon on the icon modify window, the flow proceeds to step S16 in which the newly modified icon is additionally arranged at a highest place (or leftmost place) in horizontal arrangement of the icons of the same group on the icon select palette as a new first high-order icon (MS1). Herein, contents of modifications are reflected on a shape of the icon. For example, if the icon is stretched in time dimension, the icon is changed in shape such that its icon symbol is stretched in horizontal dimension. In addition, a customize mark MK is attached to a prescribed position of the icon.

If the user further modifies parameters of the previously modified icon whose parameters are previously modified on the icon modify window, the flow proceeds to step S15 in which the previously modified icon is further changed (or changed again) in shape based on further modifications to provide a further modified icon (or re-modified icon), which is moved to a highest place in horizontal arrangement of the icons of the same group on the icon select palette. As described above, contents of further modifications are reflected on the shape of the further modified icon, which is regarded as a new first high-order icon (MS1).

If the step S11 does not detect that the user modifies parameters of the icon in the edit area EA of the icon modify window, the flow proceeds to step S14 in which a decision is made as to whether modification is effected in the plain piano roll area PA of the icon modify window or not. If the user modifies the plain piano roll PR so that a decision result of step S14 is "YES", the flow proceeds to step S18 in which the system modifies parameters of the icon and its corresponding note in response to modification effected on the plain piano roll PR. Then, the flow proceeds to step S13. If the step S14 does not detect that the user modifies the plain piano roll PR in the icon modify window, in other words, if the decision result of step S14 is "NO", the flow proceeds directly to step S17.

The icon modify window is not only provided for edit of the execution icon in the edit area EA but also provided for modification of a piano roll in the plain piano roll area PA. Herein, the piano roll represents a duration of a note between a tone-generation timing and a mute timing. That is, it is possible to modify the plain piano roll PR in position and/or length by moving it and/or by stretching or shrinking it in the plain piano roll area PA. The step S18 responds to modification of the plain piano roll PR. That is, in response to the modification of the plain piano roll PR, the system modifies parameters of the note such as the tone-generation timing and mute timing, and the system also modifies parameters of the icon such as the bend-up start timing and bend-up end timing. After completion of the step S18, the flow proceeds to step S15 or S16 by way of step S13. The step S15 or step S16 contributes to movement and display of the icon which reflects the aforementioned modification of the plain piano roll PR in step S18. Herein, detailed operations of the steps S15 and S16 responding to the modification of the piano roll are similar to the aforementioned operations of the steps S15 and S16 which are already described with respect to modifications of the icon.

In step S17, the system performs other processes, examples of which are described below:

(1) A process for drag-and-drop operations of the mouse by which a desired icon is selected from the icon select palette of FIG. 6A and is moved and attached to a certain execution icon layer on the score window of FIG. 2.

(2) A process for drag-and-drop operations of the mouse by which a certain execution icon attached to some execution icon layer is moved outside of a prescribed display area and is deleted.

(3) A process for allowing the user to input and modify notes on the staff notation in the staff icon layer SL.

(4) A process for controlling window sizes by operations of prescribed buttons arranged on upper right of windows such as "close" (i.e., close button "X"), "maximize" (i.e., maximize button "□") and "minimize" (i.e., minimize button "–").

(5) A process for increasing and decreasing sizes of windows by operations of corner buttons CB1, CB2, etc. which are dragged with the mouse.

(6) A process for scrolling contents of windows by operations of scroll bars SBr, Br1–Br4 and scroll buttons SBt, Bt1–Bt4.

After completion of the other processes described above, the system ends the mouse operation process.

Incidentally, the aforementioned descriptions are merely concerned with one embodiment of this invention. That is, this invention is not necessarily limited to the aforementioned embodiment, in other words, this invention is not limited to the aforementioned example of conversion algorithms for converting tune data to execution-related data and aforementioned formats of execution-related data.

As for formats which can be employed for the performance data being handled by the system of this invention, it is possible to employ any kinds of formatting methods which are described below.

(1) A first method for "event plus relative time" in which an occurrence time of a performance event is represented by a time that elapses from its preceding event.

(2) A second method for "event plus absolute time" in which an occurrence time of a performance event is represented by an absolute time that elapses in a tune or measure.

(3) A third method for "tone pitch (or rest) plus length" in which performance data is represented by a pitch and a characteristic of a note or a rest and its length.

(4) A fourth method referred to as "solid method" in which each of memory areas is secured by minimal resolution of music performance so that a performance event is recorded on a memory area corresponding to its occurrence time.

As a method for storing automatic performance data of plural channels, it is possible to employ a channel-mixture method in which data of multiple channels are mixed without alignment and sorting or a channel-independence method in which data of each channel is solely recorded on a specific track.

As for memory management, it is possible to store time-series performance data on consecutive areas, or it is possible to manage multiple data, which are stored in different areas at intervals, as consecutive data. Namely, the this invention merely requires a precondition where performance data whose storage areas are arranged at intervals or continuously arranged together can be managed as time-series consecutive data. So, this invention does not raise a problem as to whether the data are consecutively stored on the memory or not.

As described heretofore, this invention has a variety of effects and technical features, which are summarized as follows:

(1) This invention allows the user to edit performance data on the score window in which execution icons corresponding to execution-related data are attached to plural layers on the screen, wherein in response to a display-on command or a display-off command, a corresponding layer is selectively placed in a display-on state or a display-off state. That is, this invention provides the performance data editing system with a capability of selectively performing or stopping display of the layer(s), so it is possible to display only the necessary layers that the editor (or user) uses for editing the performance data while hiding unwanted layers that are not used by the editor on the score window. This eliminates possibilities in that the user mistakenly attach execution icons onto unused layers. Thus, it is possible to improve performability in editing the performance data on the screen.

(2) In response to a small-scale display command, its corresponding layer to which an execution icon (or execution icons) is being attached is subjected to small-scale display on the score window. That is, this invention provides the performance data editing system with a capability of small-scale display on each of the layers. So, it is possible to hide unwanted layers that the editor (or user) does not use for editing the performance data. In addition, the system provides the editor with visuality for allowing visual recognition of existence of the hidden layers on the screen. This eliminates possibilities in that the editor mistakenly recognizes nonexistence of the hidden layers.

(3) In response to operations for changing vertical arrangement of the layers on the score window, corresponding layers are being changed in display locations to suit to needs of the user on the screen. That is, this invention provides the performance data editing system with a capability of changing places of the layers in vertical arrangement on the score window. So, it is possible to arrange the layer which is frequently used by the user just above a musical score displayed on the score window. Namely, this invention allows the user to perform vertical rearrangement by which the layers are rearranged to suit to needs of the user (or editor) who edits the performance data. Thus, it is possible to improve performability in editing the performance data.

(4) As described above, this invention allows entry of a variety of display change instructions such as display-on (or normal-scale display), small-scale display, display-off (or non-display) and display order changes, which are given with respect to the layers to which execution icons corresponding to execution-related data are attached on the score window. That is, the layers of the score window can be changed in various display manners in response to the display change instructions. This improves manual operations of the system so that the editor is capable of editing the performance data very easily. Thus, this invention provides a specially-designed brand-new performance data editing system having high performability in editing the performance data.

(5) The system of this invention allows the user to freely move the execution icons which are attached to the layers on the score window, wherein when the user moves a certain execution icon outside of a prescribed display area, the system deletes corresponding execution-related data from the performance data. For example, when the user drags the execution icon with mouse to move it to an outside of a layer window corresponding to the layer, the corresponding execution-related data is being automatically deleted from the performance data. That is, it is possible for the user to delete unwanted execution-related data with simple operations. This eliminates the conventional troublesome operations for deletion in which the user is required to select an item of "delete" from a command menu or the user is required to move the icon onto a prescribed icon of trash can in the existing windows system, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A method for editing performance data using a computer system having a display, said method comprising the steps of:

controlling the computer system to display a plurality of layers on a screen of the display, wherein each of said plurality of layers is assigned to a different type of articulation to be added to a musical tone to be generated based on the performance data;

providing a display instruction for controlling the display setting of any one of said plurality of layers, said display setting being one of display mode and non-display mode;

in response to the display instruction, controlling the computer system to place said any one of the layers in the display mode or the non-display mode; and in response to a user instruction, attaching an execution icon at a prescribed position onto one of said plurality of layers that is displayed on the screen of the display, wherein said attached execution icon represents execution-related data for adding, to the musical tone to be generated, a predetermined type of articulation to which said one of said plurality of layers is assigned, wherein said step of attaching the execution icon causes the corresponding execution-related data to be incorporated into the performance data being edited.

2. The performance data editing method of claim 1, wherein the prescribed position in the at least one layer, to which the execution icon is attached, is determined in correspondence with progression of the performance data.

3. The performance data editing method of claim 1, wherein each layer is displayed as an execution icon layer in correspondence with the execution-related data.

4. The performance data editing method of claim 3, wherein the execution icon layer contains at least one of a tempo icon layer, a dynamics icon layer, a joint icon layer, a modulation icon layer, an accent icon layer, an attack icon layer, and a release icon layer.

5. The performance data editing method of claim 1, further comprising the step of controlling the computer system to display a name of at least one of the plurality of layers.

6. The performance data editing method of claim 1, further comprising the step of controlling the computer system to further display an operator for controlling at least one of the plurality of layers displayed on the screen of the display.

7. The method of claim 1, further comprising the steps of:

editing the execution icon attached onto one of said plurality of layers; and editing the performance data corresponding to the execution icon that is edited.

8. The performance data editing method of claim 1, wherein a musical score is displayed on the screen of the display so that the plurality of layers are displayed in relation to the musical score.

9. The performance data editing method of claim 8, further comprising the steps of:

in response to the user instruction, selecting or editing the execution icon attached to the layer; and visually displaying a prescribed range of execution-related data corresponding to the execution icon that is selected or edited on the musical score.

10. A performance data editing apparatus for editing performance data, said apparatus comprising:

a display for displaying a plurality of layers on a screen, wherein each of said plurality of layers is assigned to a different type of articulation that can be added to a musical tone to be generated based on performance data;

a first receiver for receiving a display instruction for controlling a displaying setting of any one of said plurality of layers, wherein said display setting is one of a display mode and a non-display mode;

a first controller for controlling to display or non-display of said any one of the layers in the screen of the display in response to the received display instruction;

a second receiver for receiving a user instruction to attach an execution icon at a prescribed position onto one of said plurality of layers that is displayed on the screen of the display; and a second controller for controlling to attach the execution icon at the prescribed position onto one of said plurality of layers that is displayed on the screen of the display, wherein said attached execution icon represents execution-related data for adding a predetermined type of articulation, to which said one of said plurality of layers is assigned, to the musical tone to be generated, wherein the execution-related data represented by the attached execution icon is incorporated into the performance data being edited.

11. A machine-readable media containing an executable program for causing a computer system to perform a method for editing performance data, said computer system having a display, said method comprising the steps of:

controlling the computer system to display a plurality of layers on a screen of the display, wherein each of said plurality of layers is assigned to a different type of articulation to be added to a musical tone to be generated based on the performance data;

providing a display instruction for controlling the display setting of any one of said plurality of layers, said display setting being one of display mode and non-display mode;

in response to the display instruction, controlling the computer system to place said any one of the layers in the display mode or the non-display mode; and in response to a user instruction, attaching an execution icon at a prescribed position onto one of said plurality of layers that is displayed on the screen of the display, wherein said attached execution icon represents execution-related data for adding, to the musical tone to be generated, a predetermined type of articulation to which said one of said plurality of layers is assigned, wherein said step of attaching the execution icon causes the corresponding execution-related data to be incorporated into the performance data being edited.

* * * * *